INVENTOR.
Albert E. Kimberly, Jr.
BY
Harness & Harris
ATTORNEYS.

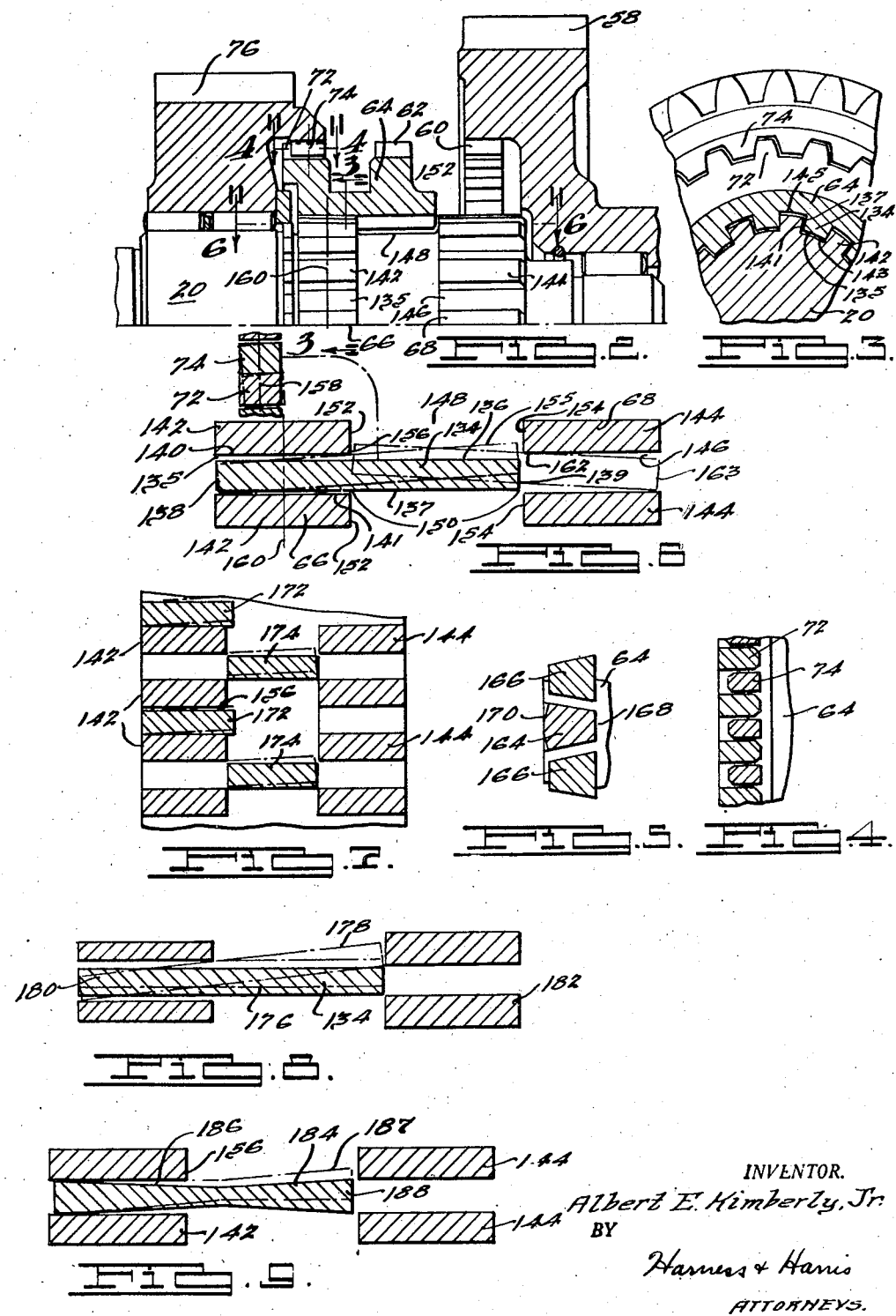

Oct. 12, 1948.   A. E. KIMBERLY, JR   2,450,896
POWER TRANSMISSION MECHANISM
Filed April 12, 1944   3 Sheets-Sheet 3
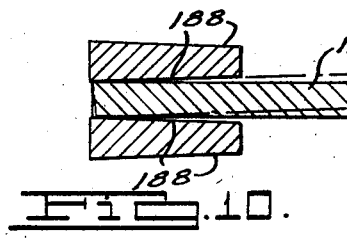
Fig. 10.
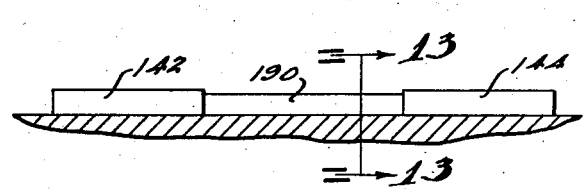
Fig. 12.
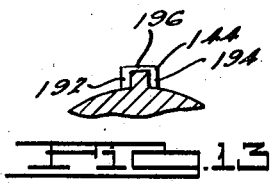
Fig. 13.
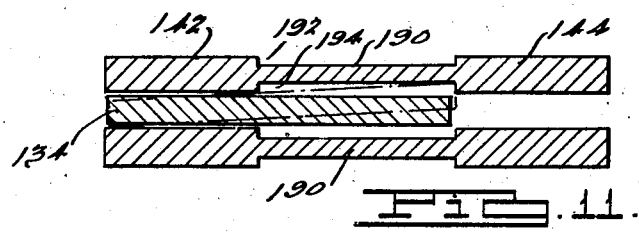
Fig. 11.
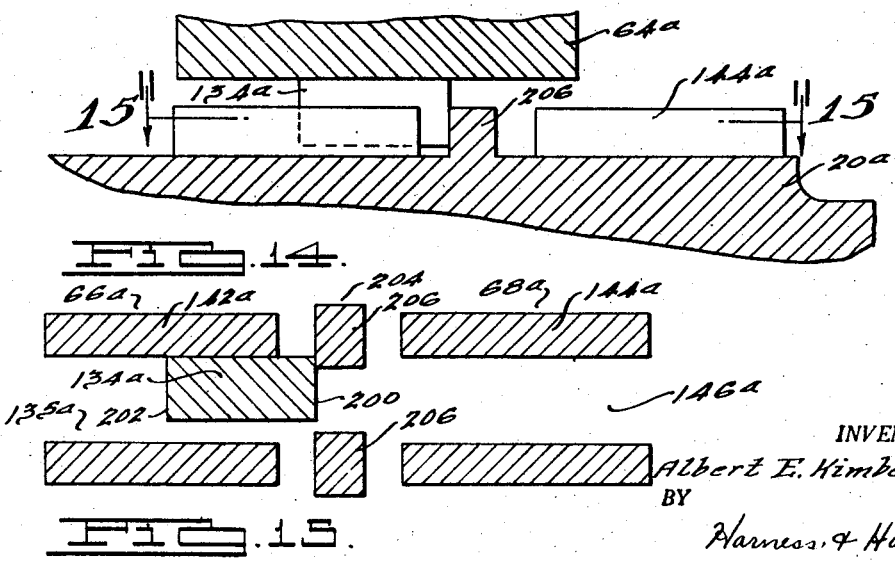
Fig. 14.
Fig. 15.
INVENTOR.
Albert E. Kimberly, Jr.
BY
Harness & Harris
ATTORNEYS.

Patented Oct. 12, 1948

2,450,896

UNITED STATES PATENT OFFICE 2,450,896

POWER TRANSMISSION MECHANISM

Albert E. Kimberly, Jr., Birmingham, Mich., assignor to Chrysler Corporation, Highland Park, Mich., a corporation of Delaware Application April 12, 1944, Serial No. 530,602

23 Claims. (Cl. 192—52)

This invention relates to power transmission mechanism and is concerned in particular with structures for inhibiting relative axial creep and jumping out of mesh between interengageable drive transmitting elements of power transmission change speed units, especially when operating under load and at low speeds.

In automotive vehicles power is conventionally transmitted from the engine to a gear transmission and thence to the driving wheels. In the case of trucks having multiple wheel drives a further gear transfer unit is usually interposed between the transmission and the driving wheels for receiving the output of the transmission and distributing power to the several front and rear drive axles. The transmission is provided with interengageable tooth clutch members and/or interengageable sliding gears all hereinafter for convenience referred in the description and claims as clutch members, selectively operable to provide a plurality of forward speeds and reverse and clutch members are available in the transfer case for further drive selections and for enabling drive of the front wheels at the driver's election.

The problem of jumping out of mesh is of considerable importance in connection with truck transfer case drives, and I have, therefore, selected such an embodiment for the purposes of illustrating my invention, it being understood, however, that the various novel features of my invention hereinafter developed are applicable to other apparatus employing drive establishing interengageable clutch members for avoiding similar difficulties.

In a typical transfer case construction a shiftable tooth clutch member is splined to the power input shaft for drive therewith and piloted fairly closely thereon. The input gear carrying the mating tooth clutch is journalled on needle bearings carried on the shaft and meshes with another gear of a reduction train. While for most driving no difficulty has been encountered in maintaining engagement of the tooth clutches during drive or coast of the vehicle under load, for reasons not entirely evident separation and total disengagement of the clutch members occasionally occurs in drive or coast under what appears to be favorable load conditions. Although various reasons have been advanced for this phenomenon, I believe it may be explained by the fact that when rotating under load the input gear was deflected away from the mesh point with its engaging gear to an eccentric and misaligned position relative to the shiftable clutch member to the extent permitted by clearances in the needle bearings and deflection of the shaft, this action being facilitated by the close piloting of the shiftable clutch member and where the gears were helical cut. Every time each driving or driven tooth of the input gear passed the mesh point, tangential separating and thrust forces acted upon the clutch teeth of the shiftable clutch member, which being free to move axially was shifted to the extent actuated by these forces. After the teeth passed the mesh point, the shiftable clutch member did not return to its previous position. Accordingly, whenever these tangential forces were acting, presumably once in every revolution of the input gear, each clutch tooth added another increment of separation and gradually in likeness to the action of a fine pitch screw thread upon a nut, complete separation of the clutch teeth was effected.

I have discovered that the difficulty may be substantially prevented by providing, first, for sufficient operational clearances in the splined driving and piloting connection between the shiftable clutch member and the shaft so that the shiftable clutch member is not restrained from axial misalignment by being closely piloted as heretofore was the case, and, secondly, by providing for pivoting of the shiftable clutch member on the shaft, for instance, on one or more of the shaft splines preferably in a position in transverse line with the clutching teeth, so that a free end or portion of the shiftable member, such as a spline, may be free to turn, rock, nutate or gyrate as necessary about the pivot relative to its opposite end even though simultaneously receiving a turning movement due to being rotated under drive or coast conditions, and be brought into blocking or abutting relation with an abutment or stop on the shaft by the resulting cocking of the shiftable clutch member so as to oppose any tendency of the shiftable member to become self-disengaged.

In one form of my invention the movement of clutch sleeve to blocking position is obtained by a predetermined camming action in initiating drive, and in a second the forces which heretofore were responsible for jumping out of mesh are utilized to obtain the desired result. Moreover, I have found that a predetermined blocking may be obtained by relative clocking movement of certain members when initiating drive to thereby bring blocking elements into blocking relationship.

Accordingly, it is the general object of my invention to provide mechanism for controlling creep and slipping out of mesh tendencies of interengaged clutch members during rotation thereof.

Another object is to advantageously employ the forces heretofore causing self-disengagement of interengaged clutch members operating under load, to oppose such disengagement.

A further object is to provide in a power transmission drive including interengaged clutch members one of which is shiftable relative to the other for controlling drive, mechanism for blocking self-disengagement of the shiftable member during rotation of the clutch members yet permitting disengagement thereof under driver control.

An additional object is to provide in a power transmission drive including interengaged tooth clutch members one of which is shiftable relative to the other for controlling drive, a clutch construction for effecting translation of the shiftable member to a blocking position for opposing self-disengagement of the clutch members during rotation thereof in response to energization of the shiftable member by forces which would normally urge the shiftable member out of engagement.

Still another object is to provide an improved power transmitting mechanism including interengageable tooth clutch members one of which is shiftable relative to the other and that provides for positive and/or energized blocking of the shiftable member during engaged rotation of the clutch members to prevent disengagement of the shiftable member.

Other objects and advantages of my invention will become more apparent from the following description taken in connection with the accompanying drawings wherein:

Fig. 2 is an enlarged view partially in section of the two speed clutch mechanism of Fig. 1 embodying my invention;

Fig. 3 is a cross-sectional view taken at 3—3 of Fig. 2, the parts being shown in torque transmitting relationship;

Fig. 4 is a fragmentary cross-sectional view taken at 4—4 of Fig. 2 showing a form of clutch tooth used in my invention;

Fig. 5 is a similar view showing an interlocking form of clutch tooth;

Fig. 6 is a fragmentary cross-sectional view taken at 6—6 of Fig. 2 illustrating the manner of utilizing forces acting upon the clutch teeth during drive to nutate or cock the clutch sleeve into blocking position;

Fig. 7 is a view similarly taken showing a particular tooth arrangement;

Fig. 8 is another view similarly taken to that in Fig. 6 illustrating the manner of obtaining predetermined blocking by coaxial angular displacement when initiating drive and increasing the extent of blocking by misaligning the clutch sleeve in the manner shown in Fig. 6;

Figs. 9 and 10 are further views taken similarly to that in Fig. 6 but showing means for obtaining predetermined blocking by nutation or cocking the clutch sleeve when initiating drive;

Fig. 11 illustrates the Fig. 6 construction in slightly modified form;

Fig. 12 is a fragmentary view partially in section illustrating the shaft spline of Fig. 11 in elevation;

Fig. 13 is a fragmentary cross-sectional view taken at 13—13 of Fig. 12; and

Figs. 14 and 15 illustrate a further embodiment of the invention for obtaining positive blocking.

Figure 1:
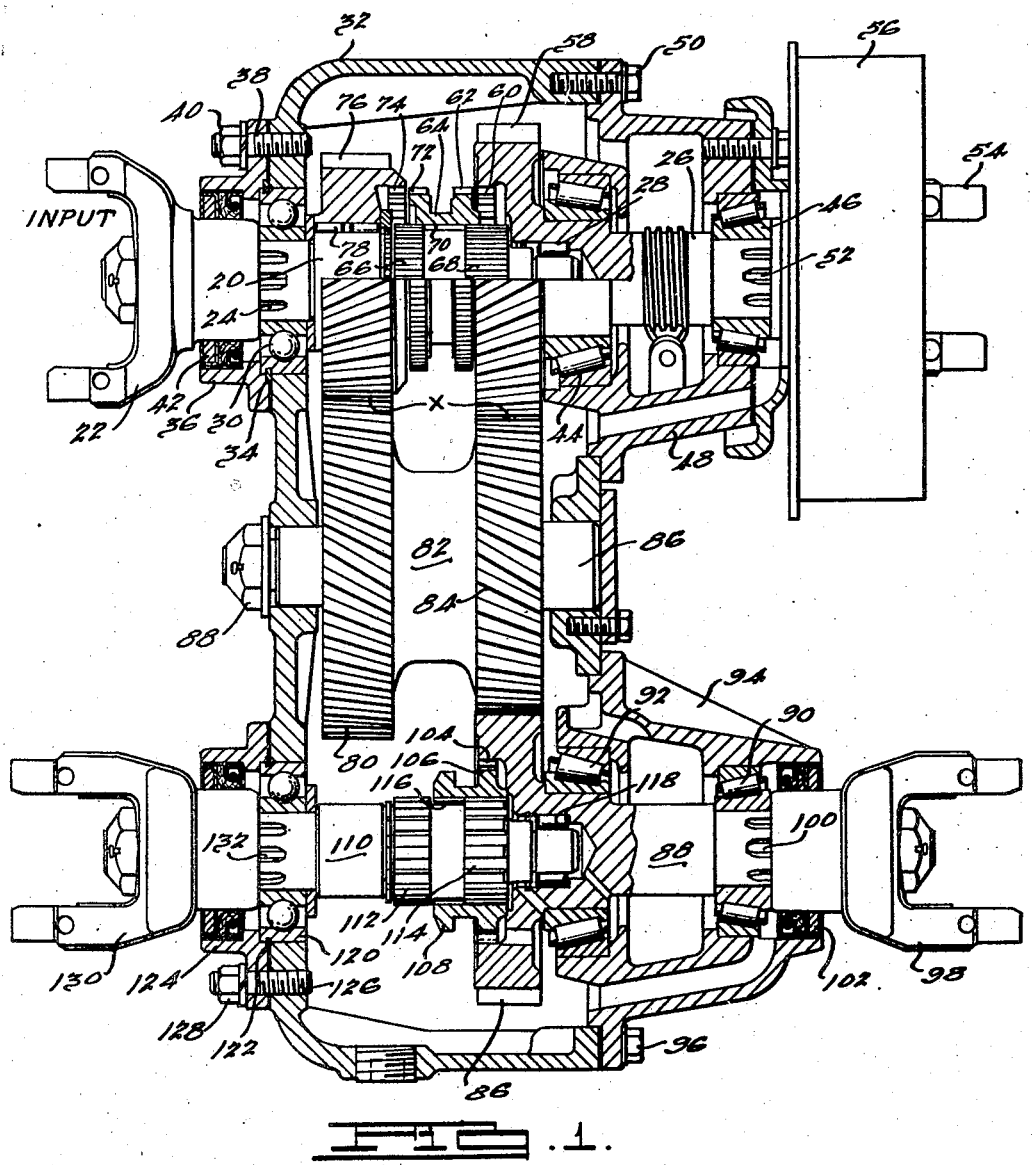
Fig. 1 is a cross-sectional view of a truck gear transfer case embodying my invention.

Referring to the drawings, my invention is illustrated embodied in an automotive truck transfer gear case commonly used to transmit power from a motor driven transmission to the drive axles of a 6-wheel drive and having clutch means for obtaining low and high speed ratios and clutch means for disconnecting the vehicle front wheels from drive at the driver's option.

As shown in Fig. 1, the transfer unit comprises a driving or input shaft 20, adapted to receive power from the gear transmission through a propeller shaft (not shown) connected to the universal coupling 22 splined to the shaft 20 as at 24. One end of the shaft 20 is piloted in the end of a first output shaft 26, on needle bearings 28 and the other end is carried in a ball bearing 30 mounted in the casing 32 and retained therein by an annular retaining ring 34 and an adaptor 36, the latter being secured to the casing by screw studs 38 and nuts 40. The adaptor 36 includes an oil seal 42 positioned between the hub of the coupling 22 and the adaptor 36.

The shaft 26 is journalled in roller bearings 44 and 46 respectively carried in a cover bracket 48 bolted to the casing 32 as at 50. The outer end of the shaft 26 has splined thereto as at 52, a universal coupling 54 for connecting this shaft with the rear axle of the vehicle by a propeller shaft, not shown. A brake drum 56 is carried on the coupling to apply braking force to the shaft 26 when desired. Integral with the shaft 26 is a high speed gear 58 having on its inner end a set of internal clutch teeth 60 adapted to be engaged by a mating set of external clutch teeth 62 on an axially shiftable clutch sleeve 64 telescoped with and splined to the shaft 20. The splined connection, as shown in Fig. 1, comprises spaced sets of splines 66 and 68 respectively on the shaft 20 and a set of internal splines 70 on the shiftable clutch member 64 engageable therewith. The shiftable clutch sleeve 64 also includes a second set of external clutch teeth 72 adapted to be engaged with a mating set of internal clutch teeth 74 on an input gear 76 journalled on needle bearings 78 on the shaft 20 so as to be freely rotatable relative to and on said shaft.

The input gear 76 meshes with a gear 80 of an idler gear cluster 82 which includes a gear 84 that meshes with the output shaft gear 58. The cluster 82 is rotatably mounted on ball bearings, not shown, supported on a stud 86 secured to the casing 32 by a nut 88. The gear 84 also meshes with a pinion 86 which is an integral part of a second output shaft 88 supported between roller bearings 90 and 92 respectively carried in a supporting bracket 94 secured to the casing 32 by bolts, one of which is shown at 96. A universal coupling 98 is splined to the shaft 88 as at 100 and is adapted to be coupled to a propeller shaft, not shown, for transmitting power to the rear drive axle of the vehicle. An oil seal 102 is located between the shaft 88 and the bracket 94 to prevent oil leakage. The gear 86 includes a set of internal clutch teeth 104 adapted for engagement with a mating set of clutch teeth 106 on a shiftable clutch sleeve 108 which is splined to a third output shaft 110, the splined connection including spaced sets of splines 112 and 114 on the shaft 110 and internal splines 116 on the shiftable clutch member 108. The shaft 110 has one end piloted on needle bearings 118 in the end of the shaft 88 and its opposite end portion supported in a ball bearing 120 secured in the casing 32 by an annular ring 122 and adaptor 124 secured to the casing 32 by screw studs 126 and nuts 128. A universal coupling 130 is splined to the shaft 110 as at 132 and is adapted to be connected to a propeller shaft, not shown, to transmit power to the front drive axle of the vehicle.

The shiftable clutch member 64 on the input shaft 20 is shiftable by means not shown under control of the driver to any one of three positions; a neutral position as shown, wherein it is disengaged from the input gear 76 and from the output gear 58; a second position where it is engaged with the input gear 76 through the clutch teeth 72, 74 to obtain low speed drive; and a third position where it is engaged with the high speed gear 58 through the clutch teeth 60, 62 to obtain high speed drive. When low speed is established, drive is transmitted from the input shaft 20 through the splined connection to the shiftable clutch member 64, thence through the clutch teeth 72, 74 to the input gear 76 and through the idlers 80, 84 to the high speed gear 58 which drives the first output shaft 26. The gear 58 being larger than gear 76 and the idler gear 80 being larger than the idler gear 84, a reduction drive is thus obtained between the shafts 20 and 26 when the clutch teeth 72 and 74 are engaged for low speed drive. The gear 86 on the second output shaft 88 preferably has the same number of teeth as the gear 58 and the second output shaft will also be driven in low at the same relative speed and in the same direction as the output shaft 26. When the shiftable front wheel drive clutch sleeve 108 is engaged with the gear 86 through the clutch teeth 104, 106, the third output shaft 110 will also be driven in low at the same speed and in the same direction of rotation as that of the shafts 26 and 88 respectively. It will be observed that by releasing the drive between the clutch teeth 104 and 106 the shaft 110 may be disconnected from drive and in this manner limiting drive to the rear and rear rear drive axles only.

High speed is established by shifting the shiftable clutch member 64 to engage the clutch teeth 60 and 62 in drive, power then being transmitted directly from the input shaft 20 to the first output shaft 26 and gear 58 through the splined connection with the shiftable clutch sleeve 64. Simultaneously drive is transmitted through the idler gear 84 to the gear 86 this also driving the second output shaft 88 and the shaft 110 in high. Manifestly, if the clutch teeth 104 and 106 are disengaged no drive will be given the front wheel drive shaft 110.

In operation of the transfer gear unit, it is desirable that there be no unexpected interruption in the transmission of driving torque from the input to the output shafts of the mechanism once the clutches have been engaged in a predetermined drive establishing position. For example, if the movable clutch member 64 has been shifted to low speed position, it is important that it remain thus engaged until some affirmative action to obtain a different speed condition is initiated by the driver. However, this result has not always been attainable and usually at the most inappropriate time, the member 64, for example, has walked out of mesh to condition the vehicle in free wheel, this action resulting as heretofore explained, from displacement and misalignment of the input gear 76 under load condition causing its teeth as they pass through the mesh point X (Fig. 1) at the junction of the gears 76 and 80 to produce cyclic thrust effects upon the clutch teeth to gradually and completely disengage the clutch members, the thrust being aggravated where the gears 76 and 80 are of the spiral cut type.

A feature of the invention is to overcome the foregoing difficulty by providing means for positive and/or energized blocking of the clutch member in engaged position so that this member will be prevented from becoming self-disengaged yet may be disengaged under driven control without requiring any special or additional operations.

Referring now more particularly to Figs. 2 to 6, it will be recalled that the clutch sleeve 64 is splined to the shaft 20 in a manner for receiving drive therefrom and to permit axial movement thereof between low and high speed drive establishing positions. To this end the clutch sleeve 64 is provided with an elongated internal radial tooth or spline 134 preferably of truncated V form extending axially of the sleeve and substantially paralleling the same, which is received in a splineway 135 in the shaft 20, of complementary shape to the tooth. The tooth 134 has opposite flanks or side faces 136 and 137 respectively, and opposite ends 138 and 139 respectively. The splineway 135 is formed by opposite walls 140 and 141 respectively, which may if desired be flanks of a pair of longitudinally extending external teeth 142, and by a bottom wall 143. Preferably, in order to distribute the driving load between the clutch sleeve and shaft and avoid excessive tooth size, the shaft 20 will be provided with a set or series 66 of uniformly, circumferentially spaced radial teeth 142 formed by cutting a series of external splineways 135 in the shaft 20. Similarly, the shift sleeve 64 will be provided with a series of circumferentially spaced teeth 134 formed by cutting splineways 145 in this member.

It will be observed that the shaft 20 is provided with a second set 68 of radial teeth 144 and splineways 146 similar to those of the set 66 and having their axes aligned with the teeth and splineways respectively of the set 66 so as to form substantial continuations thereof but spaced from the set 66 by a recess 148 the function of which will subsequently be explained.

In general the teeth 134, 142 and 144 in the Fig. 6 construction will be of the same chordal size as their mating splineways, sufficient operating clearance (back lash) being provided between adjacent engaging teeth and between the tops of the teeth and the bottoms of the splineways in order to avoid close piloting of the shift sleeve 64 upon the shaft teeth and to allow limited nutation or gyration of the clutch sleeve 64 with its attendant cocking relative to the shaft 20 during drive in response to forces acting upon the sleeve clutch teeth. In this connection it will be noted that when the shift sleeve is engaged in low speed as shown in Figs. 2 and 6, the teeth 134 are engaged only with the teeth 142 of the set of shaft teeth 66 and are entirely disengaged from the set 68 of shaft teeth. Moreover, in this position a substantial portion 150 of the teeth 134 in effect overhang the inner ends 152 of the teeth 142 and project into the recess 148 with their ends 139 juxtaposed to the inner ends 154 of the teeth 144 of the set 68, and just short thereof.

When now the resultant of the forces acting at and adjacent the mesh point X and upon the clutch teeth 72 and which heretofore caused separation of the clutch teeth 72, 74 come into play the clutch sleeve instead of limiting itself to axial movement will, because of the backlash and piloting clearances follow the normal urging of the clutch teeth 74 to become misaligned relative to the shaft axis and will rock on one or more of the teeth 142 using the corners 156 of these teeth as a fulcrum with the result that the ends 139 of the projecting portions 150 of the sleeve teeth 134 circumferentially speaking then on either side of the fulcrum will be oriented about the fulcrum and transversely of the teeth 144 effecting an overlap of these ends with the ends 154 of the teeth 144 of the set 68, for instance as shown in phantom at 155 in Fig. 6 where the broken lines show the oriented position of the clutch and sleeve teeth. It will be observed that as the successive teeth of the gear 76 move into the mesh point X, different shaft splines 142 will successively become the fulcrum for the sleeve 64. Thus the teeth 134 upon tendency of the clutch teeth 72, 74 to become disengaged will be brought into blocking or abutting relationship with the ends or abutments 154 of the teeth 144 which will prevent axial movement of the clutch sleeve, and consequently disengagement of the clutch teeth. In order that adequate tooth overlap be obtained it is preferred that the overhang 150 be at least as great and better yet greater than the amount of normal tooth contact between the teeth 134 and 142 which in Fig. 6 is the length of the teeth 142. This should provide an overlap at least equal to the backlash between the teeth 134 and 142. Moreover, it is preferred that all corners of the teeth 134 and the inner corners of the teeth 142 and 144 be sharp to facilitate this result.

In making the shift from low to high the shift sleeve will be initially piloted by the tooth set 66 which will guide the sleeve teeth 134 into the splineways 146 whereupon the sleeve is piloted by both sets 66, 68 of teeth until finally just prior to full engagement of the clutch teeth 60, 62 the sleeve will leave the teeth of the set 66 and be piloted solely by the set 68. Manifestly, the reverse will occur in shifting from high to low.

When establishing in high position the ends 138 of the sleeve teeth 134 will overhang the teeth 144 in the same manner as the ends 139 in Fig. 6 and the sleeve teeth 134 will pivot on the corners 162 of the teeth 144 upon tendency of the clutch teeth 62 to disengage during power drive to bring the ends 138 into abutting relation with the teeth 142 as shown in phantom at 163.

Manifestly, should the disengagement of the clutch teeth tend to occur under coast conditions when in either low or high, the adjacent inner corner of the teeth 142 and 144 will become the pivot points for rocking or nutating of the clutch sleeve.

It will be observed that the mean line of pressure contact between the clutch teeth 72, 74 as represented by the line 158 in Fig. 6 is offset from the fulcrum point 156 so that ample leverage is provided for effecting nutation of the sleeve. Moreover, the mean line of pressure between the teeth 134 and 142 as represented by the line 160 in Fig. 6 and between the teeth 72 and 74 as represented by the line 158, are also displaced from each other in the Fig. 6 construction. It is preferred, however, for purposes of minimizing jumping out of mesh tendencies to have these pressure lines coincide.

Although the abutments 154 in Fig. 6 have been illustrated in the form of teeth, it will be understood that stop means of other form may be provided, this being especially true where only a single engaging shift is made as in the case of the shift sleeve 108 for controlling drive of the front wheel drive axle. Moreover, it will be understood that independent means or projections may be provided on the sleeve 64 in lieu of the tooth ends 139 for making the abutting contact.

However, where a double shift engagement is contemplated as in the Fig. 2 construction, I have found it desirable to use the teeth of the splined connection as abutments, these teeth thereby serving a multiple function, that of pilot portions during shifting, and as stops during slipping out of mesh tendencies. In this connection it will be pointed out that although the sleeve teeth are disengaged from the teeth 144 of the set 68 when established in low speed position no difficulty will be experienced making shifts into neutral or high speed position since the action of the shifting fork (not shown) during shifting will be to align the teeth with the splineways 146 to facilitate the shift and to enable the teeth 134 and 144 to slip by each other.

I have found that in certain cases, for example, where the amount of overlap obtainable is limited to critical amounts that anti-slip protection may be enhanced by using an interlocking keystone type of clutch tooth as shown in Fig. 5 instead of the normal and preferred form of tooth shown in Fig. 4, the combination of the structure in Fig. 6 employing keystone teeth having been found to be especially effective under such conditions. It is to be observed that I have found that keystoning alone will not provide a foolproof jumping out of mesh preventive. Moreover, when operating with this type of interlocking tooth considerable backlash is required between the teeth of the engaged clutch members in order to provide for engagement and disengagement thereof. As seen in Fig. 5 the tooth 164 of the sleeve 64 is tapered oppositely to the teeth 166 of the gear 76, a taper of about 10° being found suitable. Moreover, the distance between the teeth 166 at the end 168 of the space between the teeth will be greater than the chordal thickness of the tooth 164 at the end 170 to enable interengagement of the teeth. When the clutch members are engaged in drive the contacting tapered faces will provide limited interlock between the clutch members.

In Fig. 7 an arrangement of the shaft and sleeve is illustrated in low speed position providing similar functions to that of the structure in Fig. 6 but wherein alternate sleeve teeth 172 pilot the sleeve between alternate pairs of shaft teeth 142 and alternate sleeve teeth 174 offset from the teeth 172 provide the blocking function relative to the teeth 144 of the shaft, it being noted that the teeth 172 will project sufficiently beyond the inner ends of the teeth 142 to provide for pivoting of the sleeve on the pivot corners 156, for example, of alternate shaft teeth. It will also be observed that in this construction the teeth 174 will serve as pilot teeth and the teeth 172 as stop teeth when the sleeve 64 is established in high speed position.

The construction in Fig. 8 is very similar to that in Fig. 6, the main distinction and which is another feature of my invention being that the teeth of the set 66 are thinner than those of the set 68 and as shown in Fig. 8 centrally aligned with the teeth of the set 68. Thus the tooth flanks of the adjacent sets of teeth are offset from one another and it will be noted that when the gear 76 is being driven the sleeve teeth 134 will immediately assume a predetermined position relative to the teeth of the set 68, as shown by the phantom outline 176, to provide a slipping out of mesh stop under all conditions. Manifestly, the positive overlap will serve to supplement that obtained by cocking of the shift sleeve when the forces tending to produce jumping out of mesh act upon the clutch teeth, the combined effect being illustrated in phantom at 178. This combination is particularly applicable to cases where only limited overlap may be obtained by rocking or nutating movement of the sleeve 64. In practice, a reduction in the sleeve teeth thickness of about .010" on a side will provide good results. Should blocking be essential only in one of coast or drive conditions one side only of the teeth need be relieved.

It will also be understood that the arrangement in Fig. 8 is best suited for cases where only a single engaging shift is to be made as in the case of the sleeve 108. However, where only one or the other of coast or drive blocking is essential double shifting is practicable and in such instances the teeth of the sets 66 and 68 will be in effect circumferentially offset from each other and of the same chordal thickness.

In Fig. 9 I have illustrated another feature of my invention. The general arrangement of sleeve and shaft teeth is similar to that in Fig. 6. However, the sleeve teeth 184 are tapered inwardly from each end, forming in effect two abutting trapezoids of which the outer ends of the teeth are the bases. The amount of taper will be sufficient to provide a suitable extent of blocking. The combination differs functionally from the Fig. 6 arrangement in that predetermined blocking will be effected by the shaft teeth when, as in the Fig. 2 arrangement, they are engaged with the tapered faces 186 of the sleeve teeth under drive conditions, the shaft teeth then nutating the sleeve around the pivot points 156 to blocking position, 187, i. e. to bring the ends 188 of the sleeve teeth in abutting relation with the shaft teeth 144. Under coast conditions the sleeve may be rocked or nutated under urging of the shaft teeth or if jumping out of mesh forces are then acting by the clutch teeth 74. The instant construction, it will be noted, provides positive blocking functions without depending upon jumping out of mesh conditions and without employing different widths of teeth or offset teeth as described with respect to Fig. 8. In addition, the tooth form I use here gives a greater extent of blocking face, i. e., overlap, for the same chordal thickness of sleeve tooth as in Fig. 6, such being due to the inward taper of the teeth. Moreover, the illustrated embodiment provides for blocking where double shifts are necessary as with the shift sleeve 64.

The construction in Fig. 10 functions similarly to the construction in Fig. 9, but differs in that the shaft teeth rather than the sleeve teeth are provided with inwardly tapered faces 188 in the set 66. This construction is somewhat simpler and less costly to produce than that of Fig. 9 and will operate both under drive and coast conditions but appears to be limited to usage for single shifts. The dot and dash outline of the tooth 134 shows the blocking position of the teeth in this arrangement.

When it is desired to provide a somewhat sturdier construction of the shaft teeth 142, 144 a form of construction shown in Figs. 11, 12, and 13 may be followed. Here the teeth 142 and 144 are in effect connected by web portions 190. The construction may be obtained by suitably relieving the central portion of long sleeve teeth by flank recesses 192, 194 and a top recess 196 to effect spaced tooth portions simulating the teeth 142, 144 of Fig. 6. Recesses about .010" deep have been found satisfactory in actual practice. The operation of this construction will be similar to that described with respect to Fig. 6 with the exception that the web 190 will limit the extent of cocking of the shift sleeve 64 as will be evident from the phantom outline of the tooth 134 in this figure when in blocking position.

In Figs. 14 and 15 I have illustrated a further construction, related to that of Fig. 8, in that this structure also provides for clocking of the clutch sleeve into a blocking position relative to the shaft when initiating drive between these members. The shift sleeve 64a in these figures is provided with an internal tooth 134a, a series of these teeth of uniform chordal thickness and uniform circumferential spacing being preferably provided. The ends 200, 202 of the teeth are spaced from the ends of the shift sleeve an amount to accommodate the two clutch engaging positions of the sleeve. The shaft 20a has spaced sets 66a and 68a of aligned, external radial teeth 142a and 144a respectively, forming splineways 135a and 146a respectively, for guiding the teeth 134a during shifting operations of the sleeve 64a. Intermediate the sets 66a and 68a is a third set 204 of radial teeth 206 aligned with the teeth 142a and 144a respectively. It will be observed that the teeth 206 are of greater chordal thickness than the teeth 142a, 144a so as to bring the teeth 134a into blocking relation with the teeth 206 when the teeth of the shaft and shift sleeve are in drive or coast engagement, the tooth 134a in Fig. 15 being shown in blocking position when the parts are in drive. While the disclosed structure may be made in several ways it is preferred that the teeth 134a and 206 be of normal chordal thickness and the splineways between adjacent teeth 206 be complementary in size and shape to the teeth 206 with allowances for operational clearance. On the other hand teeth 142a and 144a will be relieved to obtain the necessary overlap for blocking. In actual practice about .010" to .015" off each flank of the teeth 142a and 144a will give satisfactory results without interfering with shift of the sleeve under driver control from low speed to neutral or high speed position. By providing sharp corners on the teeth 134a and 206 the extent of tooth relief may be minimized. Manifestly, the structure in Figs. 14 and 15 will function in low or high and under drive or coast conditions the necessary blocking faces being provided as shown in these figures.

The foregoing description has particularly emphasized blocking functions under drive conditions with the clutch shift sleeve in low speed position. It will be understood that similar functions will be obtained under coast conditions, and in high speed position of the sleeve, other and obvious portions of the described structures then coming into play to provide the desired functions.

It will also be evident that certain relationships in the drawings, for example, the extent of tooth blocking have been somewhat exaggerated in order to better illustrate the features of the invention.

Moreover, while the particular structures herein described are well adapted for carrying out the objects of the invention, it will be understood that various modifications, changes and substitutions may be made without departing from the spirit thereof. Furthermore, the various features disclosed and described may be combined in ways other than those shown without departing from the present teachings. The present invention is therefore to be construed to include all such modifications, changes and substitutions as may come within the scope of the following claims.

I claim:

1. Power transmitting mechanism comprising a pair of interengageable rotatable clutch members, a third rotatable member drivingly connected with one of said clutch members and in telescoping relation therewith, said third member and said one clutch member having relative axial movement and there being a pair of axially spaced pilot portions on said third member for guiding said one clutch member between engaged and disengaged positions, said one clutch member being arranged and constructed to have a portion thereof extending axially beyond one of said pilot portions into the space between said pilot portions and short of the other pilot portion when said clutch members are engaged, the said extension being at least equal to the axial extent of said one pilot portion, and there being sufficient piloting clearance between said one clutch member and said one pilot portion to permit limited axial misalignment of said one clutch member relative to said third member upon drive of said clutch members when engaged whereby said extending portion of said one clutch member may be urged into blocking position relative to said other pilot portion to oppose tendency of said one clutch member to become self disengaged.

2. Power transmitting mechanism comprising a pair of interengageable rotatable clutch members, a third member in splined drive connection with one of said clutch members and having relative axial movement with respect to said one member, said splined connection comprising a spline on said one clutch member and a pair of circumferentially spaced piloting splines on said third member providing a splineway for receiving the said spline of said one member with operational clearance to allow limited relative movement in the driving and piloting connection between said one clutch member and said third member, said pair of splines of said third member having a transverse recess intermediate their length defining a first and a second axially spaced aligned spline portion of substantially equal transverse thickness on each of said pair of splines, and each of said portions having an end face at said recess forming a shoulder, said one clutch member being arranged and constructed to have a part of its said spline received between said first portions of said pair of splines of said third member and another part extending within the said transverse recess of said third member and offset from each of the said second spline portions when said clutch members are also engaged and said one and third members are coaxial and said operational clearance being sufficient to permit cocking of said one clutch member relative to said third member about a said first spline portion of said third member upon drive between said clutch members whereby said extending spline may be cocked into blocking relation with one of said shoulders of a said second spline portion of said third member to provide abutments to oppose tendency of said one clutch member to become self-disengaged.

3. Power transmitting mechanism comprising a pair of interengageable rotatable tooth clutch members, a third rotatable member in telescopic relation with one of said clutch members, said third member and one clutch member being relatively movable axially thereof, said third member having axially spaced pilot portions for guiding said one clutch member when shifting between engaged and disengaged positions including means for drivingly connecting said one and third members, one of said pilot portions serving to guide said one clutch member in establishing drive engagement between said clutch members and the other pilot portion guiding said one clutch member during normal disengagement of said clutch members, said one clutch member being arranged and constructed to have a portion thereof extending axially beyond said one pilot portion an amount at least equal to the axial extent of said one pilot portion, in the space within said pilot portions when said clutch members are in drive engagement, and there being sufficient piloting clearance between said one clutch member and said one pilot portion to allow limited rocking movement of said one clutch member relative to said third member during drive engagement of said clutch members whereby said extending portion of said one clutch member will be urged into abutting relation with said other pilot portion upon tendency of said clutch members to become self-disengaging and will abut said other pilot portion before said clutch members become disengaged.

4. Power transmitting mechanism comprising a first rotatable member, a second rotatable member slidable axially relative to said first member, a third rotatable member, circumferentially spaced teeth and grooves on each of said members, certain teeth being interengageable for drivingly connecting said first and second members, and certain teeth being interengageable for drivingly connecting said second and third members, the teeth of one of said first and second members being arranged in axially spaced first and second sets of teeth, the teeth of said sets being axially aligned and of substantially the same transverse thickness and having an end face at the axial space between said sets of teeth to provide transverse abutments, the teeth of the other of said first and second members being engageable with the teeth of said first set of teeth when said second and third members are also interengaged, and certain teeth of said other member when so engaged extending axially into the said axial space between said sets of teeth and clear of the teeth of said second set of teeth to facilitate cocking of the teeth of said other member about the teeth of said first set of teeth; there being sufficient operating clearance between said first and second members in their said tooth connection to permit cocking of said slidable second member relative to said first member during transmission of torque between said members whereby said extending teeth may be cocked into blocking relation with said transverse abutments of said second set of teeth to oppose self-disengagement tendencies of said second member relative to said third member.

5. Power transmitting mechanism comprising a pair of interengageable rotatable clutch members, a third member in splined drive connection with one of said clutch members, and having operational clearance therewith to permit axial movement of said one clutch member relative to said third member, said splined connection comprising a spline on said one clutch member having an end face, a splineway on said third member for receiving said spline with operational clearance to allow limited relative rotation between said one clutch member and said third member, said splineway having a sidewall interrupted intermediate its length by a recess providing first and second wall portions each having an intersecting transverse face determined by said recess, said one clutch member being arranged and constructed to have one portion of said spline in engagement with said first wall portion of said splineway and another portion of said spline having said end face, projecting beyond said first wall portion adjacent said transverse recess and short of said second wall portion when said clutch members are engaged in drive, and engageable with said second wall portion when said clutch members are disengaged, and said operational clearances being sufficient to permit limited cocking movement of said one clutch member relative to said third member during drive of said clutch members when engaged whereby said end face of said projecting spline portion will be urged into blocking relation with said transverse face of said second wall portion upon tendency of said one clutch member to become self-disengaged, to thereby substantially prevent said disengagement.

6. In a power transmitting mechanism having a pair of rotatable clutch members, a third rotatable member in telescoping relationship with one of said clutch members and journaling the other of said pair of clutch members with operational clearance, the said one clutch member having teeth interengageable with pilot teeth on said third member to provide a driving connection therebetween and being shiftable axially on the latter while being piloted by its said teeth to effect engagement of said pair of clutch members, a gear integral with said other clutch member, a pinion meshed with said gear, said pinion and gear having helical cut teeth and said third member being subject to deflection upon transmission of torque between said gear and pinion, said deflection and operational clearance being sufficient to effect a misalignment of said gear and other clutch member relative to said one clutch member when said clutch members are engaged and torque is being transmitted between said gear and pinion; the improvement which consists in said third member having an annular recess intermediate the length of its said teeth defining first and second tooth pilot portions of substantially equal thickness on these teeth each having a transverse shoulder to serve as an abutment; in said one clutch member when engaged with the other of said clutch members having its teeth which are interengageable with the teeth of said third member interengaged only with the said first portions of said teeth and having a part thereof extending beyond said first tooth portions into said recess and clear of said second tooth portions; and in having operational clearances in the said driving and piloting connection between the said first tooth portions of the teeth of said third member and the teeth of said one clutch member interengaged therewith, the said clearances being sufficient to facilitate cocking of said first clutch member in response to misalignment of said other clutch member and gear when torque is being transmitted between said gear and pinion whereby the said extending parts of the teeth of said first clutch member will be cocked into blocking relationship with said abutments of the said second tooth portions of the teeth of said third member and urged into engagement with said abutments upon tendency of said one clutch member to become self-disengaged.

7. Power transmitting mechanism comprising a first rotatable member, a second rotatable member slidable axially relative to said first member, a third rotatable member, interengageable clutch teeth on said second and third members for drivingly connecting the same, torque transmitting means on said first member, an abutment on said first member axially spaced from said means, torque transmitting means on said second member having a first portion for drivingly engaging said torque transmitting means of said first member when said clutch teeth are engaged in drive, and also then having a second portion between said torque transmitting means of said first member and said abutment and normally offset relative to the latter when said first and second members are coaxial; there being sufficient operating clearance between said first and second members to permit axial misaligning of said second member relative to said first member during rotation thereof and thereby shifting of said second portion of said torque transmitting means of said second member into blocking relationship with said abutment to oppose self-disengagement tendencies of the clutch teeth of said second members.

8. Power transmitting mechanism comprising a first rotatable member, a second rotatable member slidable axially relative to said first member, a third rotatable member, interengageable clutch teeth on said second and third members for drivingly connecting the same, a torque transmitting tooth on said first member, a second torque transmitting tooth on said second member for engaging said first tooth when said clutch teeth are engaged in drive, an abutment on said first member angularly displaced from said first tooth in the direction of rotation thereof and an abutment on said second member angularly displaced from said second tooth in the direction of rotation thereof, the said abutment being in blocking position relative to each other when said first and second teeth are engaged in drive.

9. Power transmitting mechanism comprising a first rotatable member, a second rotatable member slidable axially relative to said first member, a third rotatable member, interengageable clutch teeth on said second and third members for drivingly connecting the same, a torque transmitting tooth on said first member, an abutment on said first member axially spaced from said tooth and substantially in line therewith and of the same chordal thickness as said tooth, torque transmitting means on said second member having a first tooth portion for engagement with said tooth of said first member when said clutch teeth are engaged and also then having a second tooth portion axially removed from said first tooth portion and between said tooth of said first member and said abutment and normally offset from the latter when said first and second members are coaxial; there being sufficient operating clearance between said first and second members to permit cocking of said second member relative to said first member whereby said second tooth portion may be shifted into blocking position relative to said abutment to enable the latter to oppose self-disengagement tendencies of the clutch teeth of said second member during drive.

10. Power transmitting mechanism comprising a first rotatable member, a second rotatable member slidable axially relative to said first member, a third rotatable member, interengageable clutch teeth on said second and third members for drivingly connecting the same, a pair of spaced torque transmitting teeth on said first member, an abutment on said first member axially spaced from said teeth and substantially aligned with one of said teeth, a torque transmitting tooth on said second member having a first portion received between said pair of teeth on said first member when said clutch teeth are engaged and also then having a second portion positioned axially between said pair of teeth and said abutment and in juxtaposition to the latter; there being sufficient operating clearance between said first and second members in said tooth engagement and sliding relationship to permit rocking movement of said second member relative to said first member about said torque transmitting teeth of said first member during drive whereby said second portion may be cocked into the path of said abutment to oppose self-disengagement tendencies of the clutch teeth of said second member.

11. Power transmitting mechanism comprising a first rotatable member, a second rotatable member slidable axially relative to said first member, a third rotatable member, interengageable clutch teeth on said second and third members for drivingly connecting the same, a plurality of elongated torque transmitting teeth on said first member, abutments on said first member axially spaced from said teeth and substantially aligned with said teeth, elongated torque transmitting teeth on said second member each having a portion interengaged with a pair of teeth of said first member when said clutch teeth are engaged and also then having a second portion at least about equal in length to the extent of interengagement of said first portion positioned axially intermediate said interengageable teeth and an abutment and in juxtaposition to the latter; there being sufficient operating clearance between said first and second members in said tooth engagement and sliding relationship to permit rocking movement of said second member relative to said first member about certain of said torque transmitting teeth of said first member during drive whereby said second portion may be cocked into the path of said abutment to oppose self-disengagement tendencies of the clutch teeth of said second member.

12. Power transmitting mechanism comprising a first rotatable member, a second rotatable member slidable axially relative to said first member, a third rotatable member, interengageable clutch teeth on said second and third members for drivingly connecting the same, first and second axially spaced sets of teeth on said first member, a third set of teeth on said member engaged with said first set when said clutch teeth are engaged, certain of said teeth of said third set also then extending axially intermediate said first and second sets of teeth and offset relative to teeth of said second set of teeth; there being sufficient operating clearance between said first and second members in said tooth engagement and sliding relationship to permit turning of said second member relative to said first member about certain of said first set of teeth upon engagement of said first and third sets of teeth in drive whereby said extending teeth may be cocked into blocking relation with the teeth of said second set to oppose self-disengagement tendencies of the clutch teeth of said second member.

13. Power transmitting mechanism comprising a first rotatable member, a second rotatable member slidable axially relative to said first member, a third rotatable member, interengageable clutch teeth on said second and third members for drivingly connecting the same, first and second axially spaced sets of teeth on said first member, the teeth of said first set being substantially aligned with and of substantially the same thickness as those of the second set and there being webs of less thickness than the teeth connecting the aligned teeth and offset from the flanks of the teeth of the second set to provide transverse abutments, a third set of teeth on said second member engaged with said first set of teeth when said clutch teeth are engaged, certain of said teeth of said third set also then extending axially between said first and second sets of teeth; there being sufficient operating clearance between said first and second members in said tooth engagement and sliding relationship to permit turning of said second member relative to said first member about certain of said first set of teeth during drive whereby said extending teeth may be shifted into blocking relation with the said transverse abutments to oppose self-disengagement tendencies of the clutch teeth of said second member.

14. Power transmitting mechanism as claimed in claim 12 wherein the teeth of said first set are of less thickness than the teeth of said second set.

15. Power transmitting mechanism as claimed in claim 12 wherein the teeth of said first set are tapered in the direction of said second set of teeth.

16. Power transmitting mechanism as claimed in claim 10 wherein said pair of torque transmitting teeth form a channel between them which converges in a direction away from said abutment.

17. Power transmitting mechanism as claimed in claim 10 wherein at least one flank of the first portion of said tooth on said second member and the corresponding flank of the second tooth portion converge toward the opposite flank of said tooth.

18. Power transmitting mechanism as claimed in claim 7, wherein the clutch teeth on said second and third members respectively are oppositely tapered to interlock when in drive engagement.

19. Power transmitting mechanism as claimed in claim 9, wherein said clutch teeth are oppositely tapered to interlock when in drive engagement and said first tooth portion on said second member has its driving face at an angle to the axis of said clutch teeth.

20. Power transmitting mechanism as claimed in claim 10 wherein the teeth of said first set are of less thickness than the teeth of said second set and said clutch teeth are oppositely tapered to interlock when in drive engagement.

21. Power transmitting mechanism comprising a first rotatable member, a second rotatable member in telescoping relation with said first member and having clutch teeth, first and second sets of axially spaced and aligned torque transmitting teeth on said first member, a third set of torque transmitting teeth on said member engageable with those of said first and second sets, a third rotatable member having clutch teeth, a fourth rotatable member having clutch teeth, said second member being axially shiftable, relative to said first member to selectively interengage the clutch teeth with the clutch teeth of said third and fourth members respectively and simultaneously to shift engagement of said third set of teeth between said first and second sets thereof, said third set of teeth including teeth positioned in the axial space between said first and second sets of teeth when said second member is in either clutch engaged position and the torque transmitting teeth of said third set are engaged with teeth of one of said first and second sets of teeth; there being sufficient operating clearance between said first and second members in said tooth engagements and shifting relationship to permit rocking movement of said second member relative to said first member about certain of the teeth of said first member then engaged with the teeth of said third set during drive engagement of said clutch teeth in one of said selected positions whereby said space positioned teeth may be shifted into blocking relation with the teeth of said first member not then engaged with said third set of teeth to oppose self-disengagement tendencies of the clutch teeth of said second member then engaged.

22. Power transmitting mechanism comprising a pair of rotatable clutch members having interengageable clutch teeth, a third rotatable member drivingly connected with one of said clutch members and in axially movable telescoping relation therewith, a pair of axially spaced pilot portions on said third member for guiding said one clutch member between engaged and disengaged positions, one of said pilot portions being transversely below said clutch teeth, said one clutch member being arranged and constructed to have a portion thereof engaged with said one pilot portion and another portion extend axially beyond said one pilot portion into the space between said pilot portions and short of the other pilot portion when said clutch members are engaged; there being sufficient piloting clearance between said one clutch member and said one pilot portion to permit limited axial misalignment of said one clutch member relative to said third member through rocking of said one clutch member about said first pilot portion upon drive between said clutch members whereby said extending portion of said one clutch member is brought into blocking alignment relative to said other pilot portion to oppose tendency of said one clutch member to become self-disengaged.

23. Power transmitting mechanism comprising a pair of interengageable rotatable clutch members, a third member in splined drive connection with one of said clutch members and having operational clearance therewith to permit axial movement of said one clutch member relative to said third member, said splined connection comprising a pair of spaced splines on said third member forming a splineway, another spline on said one clutch member received between said spaced splines, one of said spaced splines comprising axially spaced first and second portions having an intervening recess opening into said splineway and defining a transverse shoulder on said second portion at said recess, a portion of said clutch spline being engageable with said first portion of said one spline of said third member and another portion extending in the splineway adjacent said recess with its end short of said second portion of said third member spline, and said engageable portions having engageable faces at least one of which is at an acute angle relative to the axis of its member; the said operational clearance being sufficient to permit misalignment of said one clutch member relative to said third member in accordance with the angularity of said one engageable face upon drive between these members whereby the extending end of said clutch member spline may be shifted transversely into abutting alignment with said transverse shoulder to prevent disengagement of the clutch member upon tendency of said one clutch member to become self-disengaged.

ALBERT E. KIMBERLY, Jr.

REFERENCES CITED

The following references are of record in the file of this patent:

UNITED STATES PATENTS

| Number | Name | Date |
| --- | --- | --- |
| 2,070,140 | Peterson et al. | Feb. 9, 1937 |
| 2,125,526 | Trimbath | Aug. 2, 1938 |
| 2,285,106 | Bixby | June 2, 1942 |

FOREIGN PATENTS

| Number | Country | Date |
| --- | --- | --- |
| 403,943 | Great Britain | Dec. 22, 1933 |
| 411,984 | Great Britain | June 21, 1934 |